E. L. McDOWELL.
DEVICE FOR FITTING EYEGLASS LENSES.
APPLICATION FILED MAR. 13, 1916.
1,217,035.
Patented Feb. 20, 1917.
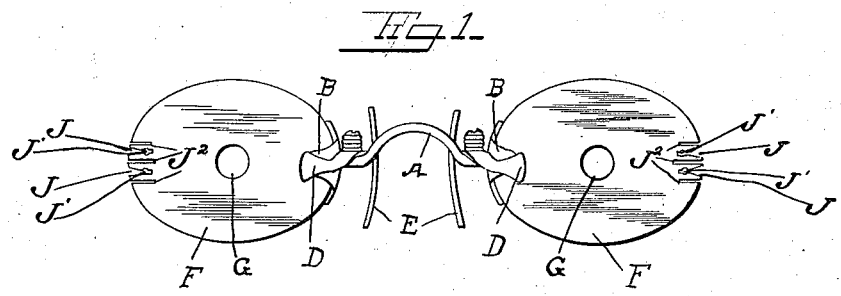
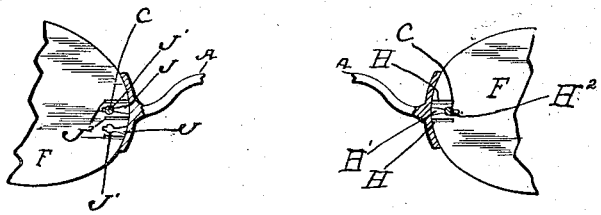
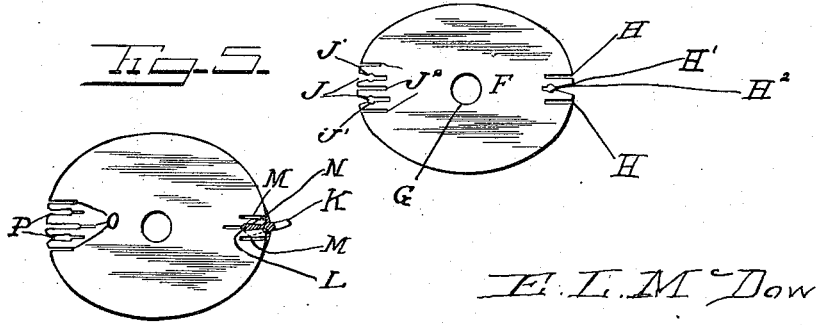

UNITED STATES PATENT OFFICE.

ERNEST L. McDOWELL, OF ARKANSAS CITY, KANSAS.

DEVICE FOR FITTING EYEGLASS-LENSES.

1,217,035.  Specification of Letters Patent.  Patented Feb. 20, 1917.

Application filed March 13, 1916. Serial No. 83,850.

*To all whom it may concern:*

Be it known that I, ERNEST L. McDOWELL, a citizen of the United States, residing at Arkansas City, in the county of Cowley and State of Kansas, have invented certain new and useful Improvements in Devices for Fitting Eyeglass-Lenses, of which the following is a specification.

My invention relates to improvements in devices for fitting eyeglass lenses, and the main object of my invention is the provision of a device for use in connection with bridge connections which will insure a perfect fitting of the lenses without removing the screws which fasten the clips upon the lenses.

Another object of my invention is the provision of a device or appliance capable of use in connection with lenses of various shapes and sizes which will insure the proper fitting of the lenses both with reference to the bridge connection and the eyes to insure the proper pupillary distance.

Another object of my invention is the provision of a device or appliance of the simplest and cheapest possible construction which will insure quickly the fitting of the lenses to meet all requirements in an efficient, satisfactory and practical manner.

With these objects in view my invention consists in the combination with a nose piece or bridge of a trial or lens substitute having an opening adapted to register with the pupil of the eye and having upon its edges a slot or slots to engage the screws of the clips on the nose piece to bring the openings in proper relation to the pupil of the eye.

The invention further consists of a device or appliance for fitting lenses to eyeglasses, embodying novel features of construction and arrangement of parts substantially as disclosed herein:—

Figure 1 is a front view of a mounting showing a pair of my trial or fitting lenses applied.

Figs. 2 and 3 are detail views showing the bridge clip and screw and the trial lenses, illustrating the use of the single and double slot arrangement of the trial lens.

Fig. 4 is a front view of one of the complete trial or fitting lenses.

Fig. 5 is a front view of a modified form.

I would state that my invention is particularly designed for use in connection with rimless eyeglasses employing a bridge which clamps upon the nose.

The mounting in connection with which I may employ my invention consists of the bridge A, having clips B, provided with lens securing screws C, and also having the finger operated levers D, carrying nose guards E.

This is a form of mounting in general use, but my invention may be used with any form of bridge having lens clips using screws to fasten the lenses in proper position to said nose.

The invention consists of a trial substitute or fitting lens F of some light transparent material such as isinglass or other like substance, having an opening G to register with the pupil of the eye. This opening would naturally be disposed in the center of the lens with reference to its edges, one of which is formed with a pair of outer slots H, and a central tapered slot H', to slide over the screw C, and formed with a screw slot or recess $H^2$, while the opposite edge of the lens is formed with the pair of parallel tapered slots J, having screw slots J', and with the series of slots $J^2$.

As it will be readily understood by those skilled in the art to which this invention appertains, it is necessary to ascertain the shape or style of lens adapted to the person being fitted with glasses and also to find the pupillary distance, all of which is attained by my invention, as hereinafter disclosed.

In using my improvement the bridge is first fitted to the nose and it is only necessary to slip the proper trial lens between the clips and upon the screws thereof, and when in proper relation with regard to the bridge and the pupillary distance is established it is simply necessary to fit the lenses exactly after the pattern or adjustment made by the trial lenses.

It will be understood that a number of trial lenses are used and that the single and plural arrangement of slots insures an accurate and instant fitting of the lenses to suit each case and every requirement.

It will be noted that my appliance insures a rapid and perfect fitting of the lenses; will fit every condition; and is efficient and practical in every particular.

In the modified form of my invention which is for use with bridges K, having lugs L, and not using screws, the lenses are formed on one edge with the pair of straight slots M and the central tapered slot N for receiving the lug L, and on the other edge with the series of straight slots O and the pair of tapered lug engaging slots P, this construction being for use with bridges not using fastening screws.

I claim:

1. In a lens fitting appliance, the combination with a mounting of the screw connection type, of an imitation lens adapted to be attached to and detached from the mounting without withdrawing the screw therefrom, said lens having a slot or slots in its edge, and means to yieldingly engage the screw of the mounting.

2. In a lens fitting appliance, the combination with a mounting of the screw connection type, of an imitation lens adapted to be attached to and detached from the mounting without removing the screw of the mounting, said lens having an opening adapted to register with the pupil of the eye and a slot or slots in its edge permitting the changing of the relation between said opening and the pupil of the eye to ascertain the pupillary distance.

3. In a lens fitting appliance, the combination with a mounting of the screw connection type, of an imitation lens adapted to be attached to and detached from the mounting without removing the screw of the mounting, said lens having means to yieldingly engage the screw of the mounting and an opening adapted to register with the pupil of the eye to ascertain the pupillary distance.

4. In a lens fitting appliance, the combination with a mounting of the screw connection type, of an imitation lens adapted to be attached to and detached from the mounting without withdrawing the screw and having means to yieldingly engage the screw of the mounting.

5. In a lens fitting appliance, the combination with a mounting, of an imitation lens capable of ready attachment and detachment therefrom and having means to yieldingly engage the attaching means of the mounting.

In testimony whereof I affix my signature in presence of two witnesses.

ERNEST L. McDOWELL.

Witnesses:
C. H. MOGLE,
Mrs. W. B. CURTIS.

Copies of this patent may be obtained for five cents each, by addressing the "Commissioner of Patents, Washington, D. C."